United States Patent
McFarlen et al.

(10) Patent No.: US 11,679,347 B2
(45) Date of Patent: Jun. 20, 2023

(54) FILTER SUPPORT ELEMENT AND METHOD OF USING SAME

(71) Applicant: McFarlen Engineering Ltd., Vancouver (CA)

(72) Inventors: Jonn McFarlen, Vancouver (CA); Trevor Robert Spens Van Bavel, Vancouver (CA); Seann Gordon Russell McFarlen, Richmond (CA)

(73) Assignee: McFarlen Engineering Ltd.

( * ) Notice: Subject to any disclaimer, the term of this patent is extended or adjusted under 35 U.S.C. 154(b) by 91 days.

(21) Appl. No.: 16/427,015

(22) Filed: May 30, 2019

(65) Prior Publication Data

US 2020/0086242 A1 Mar. 19, 2020

Related U.S. Application Data

(60) Provisional application No. 62/732,206, filed on Sep. 17, 2018.

(51) Int. Cl.
*B01D 29/15* (2006.01)

(52) U.S. Cl.
CPC ...... *B01D 29/15* (2013.01); *B01D 2201/0415* (2013.01)

(58) Field of Classification Search
CPC ............ B01D 29/15; B01D 2201/0415; B01D 29/52; B01D 2201/0446
See application file for complete search history.

(56) References Cited

U.S. PATENT DOCUMENTS

| | | | |
|---|---|---|---|
| 1,769,309 A * | 7/1930 | Rice ........................ | B28C 5/383 366/13 |
| 2,574,521 A | 11/1951 | Bailey et al. | |
| 2,726,769 A | 12/1955 | Arthur | |
| 3,853,509 A * | 12/1974 | Leliaert ................. | B01D 46/71 55/378 |
| 4,259,095 A * | 3/1981 | Johnson, Jr. ........... | B01D 46/04 55/302 |
| 4,436,633 A * | 3/1984 | Robinsky ............... | B01D 29/35 210/791 |
| 4,473,472 A | 9/1984 | Muller | |
| 4,505,816 A | 3/1985 | Wozniak et al. | |
| 4,680,038 A | 7/1987 | Titus | |
| 4,849,103 A | 7/1989 | Schmidt et al. | |
| 5,008,009 A | 4/1991 | Ciaffoni | |
| 5,135,665 A | 8/1992 | Birkenstock et al. | |
| 5,435,911 A | 7/1995 | Hohle | |
| 5,474,586 A | 12/1995 | Eaton et al. | |
| 5,525,221 A | 6/1996 | Hohle | |
| 5,599,446 A | 2/1997 | Junker et al. | |
| 5,639,369 A | 6/1997 | Bowlsbey | |
| 5,858,039 A * | 1/1999 | Schumann ............. | B01D 46/08 55/378 |
| 5,954,848 A | 9/1999 | Otto et al. | |
| 6,413,422 B1 | 7/2002 | Schumacher | |
| 6,439,273 B1 | 8/2002 | Kruger et al. | |
| 6,860,394 B1 | 3/2005 | Mueller et al. | |

(Continued)

FOREIGN PATENT DOCUMENTS

| | | | |
|---|---|---|---|
| CN | 101711928 A | | 5/2010 |
| CN | 104696531 A | | 6/2015 |
| CN | 105579109 A | | 5/2016 |
| CN | 106492626 A | * | 3/2017 |
| CN | 206549339 U | * | 10/2017 |

(Continued)

*Primary Examiner* — Waqaas Ali

(74) *Attorney, Agent, or Firm* — Oyen Wiggs Green & Mutala LLP

(57) ABSTRACT

A filter support element for a candle filter is provided. Methods of making and using the filter support element are provided.

20 Claims, 14 Drawing Sheets

(56) References Cited

U.S. PATENT DOCUMENTS

| | | |
|---|---|---|
| 2002/0096468 A1 | 7/2002 | Zuk |
| 2003/0057148 A1 | 3/2003 | Wu |
| 2004/0238437 A1* | 12/2004 | Nguyen ............... B01D 27/06 210/437 |
| 2006/0201873 A1 | 9/2006 | Smith |
| 2007/0045173 A1 | 3/2007 | Zimmerman et al. |
| 2010/0000922 A1* | 1/2010 | Crawford ............... B01D 29/21 210/167.02 |
| 2011/0174715 A1 | 7/2011 | Grodecki |
| 2013/0319928 A1 | 12/2013 | Zuber |

FOREIGN PATENT DOCUMENTS

| | | |
|---|---|---|
| DE | 3238783 A1 | 7/1983 |
| DE | 102009018934 A1 | 3/2010 |
| DE | 102012022283 A1 | 5/2014 |
| GB | 671855 A | 5/1952 |
| GB | 707257 A | 4/1954 |
| GB | 1255689 A | 12/1971 |
| GB | 1267841 A | 3/1972 |
| GB | 1380389 A | 1/1975 |
| GB | 2123309 A | 2/1984 |
| JP | H08103264 A | 4/1996 |
| JP | 2002035513 A | 2/2002 |
| KR | 20000006029 A | 1/2000 |
| KR | 20100023754 A | 3/2010 |
| KR | 20130020606 A | 2/2013 |
| KR | 20140063458 A | 5/2014 |
| KR | 20150021778 A | 3/2015 |
| PT | 2396100 E | 12/2011 |
| WO | 9005014 A1 | 5/1990 |

* cited by examiner

DETAIL A

DETAIL C

FILTER SUPPORT ELEMENT AND METHOD OF USING SAME

REFERENCE TO RELATED APPLICATIONS

This application claims priority to, and the benefit of, U.S. provisional patent application No. 62/732,206 filed 17 Sep. 2018. The foregoing application is incorporated by reference in its entirety herein for all purposes.

TECHNICAL FIELD

Some embodiments of the present invention relate to improved apparatus and methods for carrying out liquid filtration. Some embodiments of the present invention relate to a filter support element for use in candle filtration.

BACKGROUND

Pressure filters such as candle filtration units or tubular filters are widely used throughout industry to carry out filtration or thickening processes. For example, candle filters may be used to process brine, red mud, china clay, fine chemicals, and the like. Candle filters can produce a concentrated flowable slurry by partial removal of the liquid phase as filtrate.

In an example of a typical arrangement, candle filter elements are hung from a tube sheet or clarifier header. Each filter generally has a plurality of support tubes, with each one of the plurality of support tubes supporting a suitable filter media.

Typical support tubes or filter cores are perforated tubes that allow filtrate to flow through the filter media, without collapsing the media on itself. The filter media is typically slipped onto the tube or core. An example of such support tubes that are used to support filter media in the form of filter socks that are slipped over the support tubes is described, for example, in U.S. Pat. No. 5,639,369 to Bowlsbey, which is incorporated by reference herein in its entirety.

Some shortcomings associated with previous filter support designs include high installation weight, as filter surface area is frequently increased by lengthening the filter cores, which causes a corresponding increase in weight. Increased weight of the filter elements results in increased labour and time required to complete filter changes when needed. The filter media can also pleat on the support tube or core when subjected to pressure (when submerged in a liquid), which may cause reduced life of the filter media and a corresponding increase in the frequency of filter media changes and associated downtime of the system in which the filter is deployed. The filter media can also become difficult to remove from the filter core, due to pleating of the material and scaling of the tube holes. This can increase the amount of time necessary to complete filter media changes. Further, over time, the material of the filter media, such as felt, can be pushed into the apertures of the filter support, exacerbating the difficulty in removing the filter media from the support tube.

One example process that makes use of candle filtration is the kraft pulping process. As part of the kraft pulping process, white liquor is generated. As shown with reference to an example embodiment of an apparatus for carrying out a white liquor filtration process 20 in FIG. 1A, green liquor is causticized to give a causticized liquor 22 that is fed to a pressure filter 24 to clarify the white liquor for re-use in the kraft pulping process.

Pressure filter 24 is a candle filter, and includes a plurality of filtering elements 26 supported by a retaining plate 46, as seen for example schematically in FIG. 2A and in the bottom view of FIG. 2B. The causticized green liquor 22 is fed from a feed tank into pressure filter 24 below filtering elements 26 in feed zone 40 (FIG. 2A) and is forced upwardly through filtering elements 26 in filtration zone 44 (FIG. 2A) to produce filtered white liquor 28. Solids, referred to as lime mud, are prevented from passing through filtering elements 26 and collect in the base of pressure filter 24 in a settling zone 42 and are collected as lime mud 30. This pressure filtration process for white liquor clarification is generally conducted at an elevated temperature, e.g. in the range of 90-95° C. An acid tank 25 is also present.

Pressure filtration is also used in the kraft pulping process in the process of washing the lime mud produced from the white liquor filtration process. An example apparatus for carrying out the process of washing the lime mud produced from the white liquor filtration process is shown as 31 in FIG. 1B. The lime mud obtained from the white liquor filter is diluted with water or weak wash 32 in a dilution tank, and is then pumped to the lime mud washing pressure filter 34, which operates in a manner analogous to that described for pressure filter 24 to produce washed lime mud 36 and weak liquor 38.

Pressure filtration is also used in the kraft pulping process to clarify green liquor.

When used for solid-liquid separation, for example for clarification of white or green liquor or lime mud washing as part of the kraft pulping process, the filtering elements experience significant forces, for example forces of up to 100 tonnes, or more in some cases, may be exerted on the tube sheet from which the filtering elements are hung. Enough of this force is often transferred to the filter support elements to cause them to bend.

There is a general desire for improved filtration apparatus and methods which may allow for decreased downtime of a system in which the filtration apparatus is used.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a filter support element having a plurality of side supports defining a filter support surface and a spacing member connecting the plurality of side supports. The spacing members can be star-shaped, i.e. comprise a plurality of arms, with a recessed region being defined between each pair of adjacent arms. The spacing members can have an aperture configured to receive a central support, and a central support can extend longitudinally within the filter support element.

One aspect of the invention provides a method of separating a solid from a liquid, the method including providing a plurality of filter support elements. Each one of the filter support elements has a plurality of side supports defining a filter support surface and a spacing member connecting the plurality of side supports. A filter media (e.g. a filter sock) is secured over each one of the plurality of filter support elements. Each one of the plurality of filter support elements and the corresponding filter media sock is secured in place within a pressure filter to provide a plurality of filtration units, and liquid is passed through the plurality of filtration units from an upstream to a downstream direction.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 8A is an isometric view thereof. FIG. 8B is an enlarged partial view of portion A of FIG. 8A. FIG. 8C is a top view thereof. FIG. 8D is an enlarged partial view of portion C of FIG. 8A.

FIG. 10A is a front view thereof. FIG. 10B is a side view thereof. FIG. 10C is a bottom plan view thereof. FIG. 10D is a top plan view thereof. FIG. 10E is an isometric view of the bottom tip thereof. FIG. 10F is an isometric view thereof. FIG. 10G is a perspective view thereof.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used herein, the terms "inner" or "inwardly" refer to a direction towards an axial centreline of the filter support element. The terms "outer" or "outwardly" refer to the opposite direction, i.e. a direction away from an axial centreline of the filter support element.

As used herein the term "upstream" refers to the side of the filter support element that is oriented towards the inflowing mixture of liquid and solid to be separated, and the term "downstream" refers to the side of the filter support element that is oriented towards the filtrate produced by the filtration process.

While the relative terms "up" and "down", or "top" and "bottom", or "upstream" and "downstream" are used to refer to the orientation of the filter support element when in use, it will be appreciated by those skilled in the art that the filter support element could have other orientations when not in use.

Figure 3:
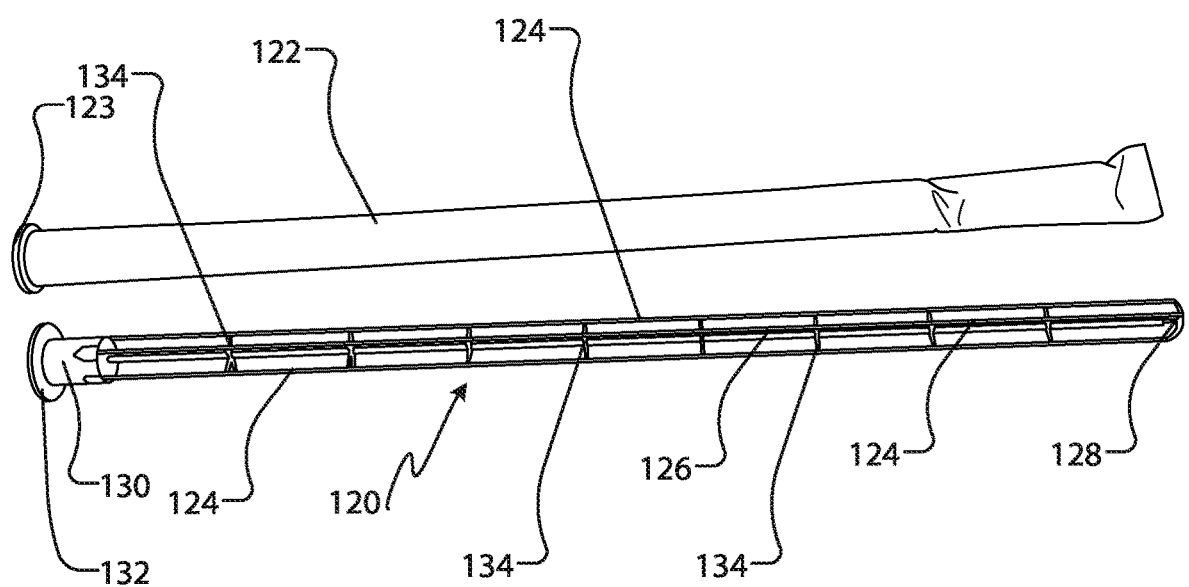
FIG. 3 shows a side view of an example embodiment of a filter support element and accompanying filter media.
Figure 4:
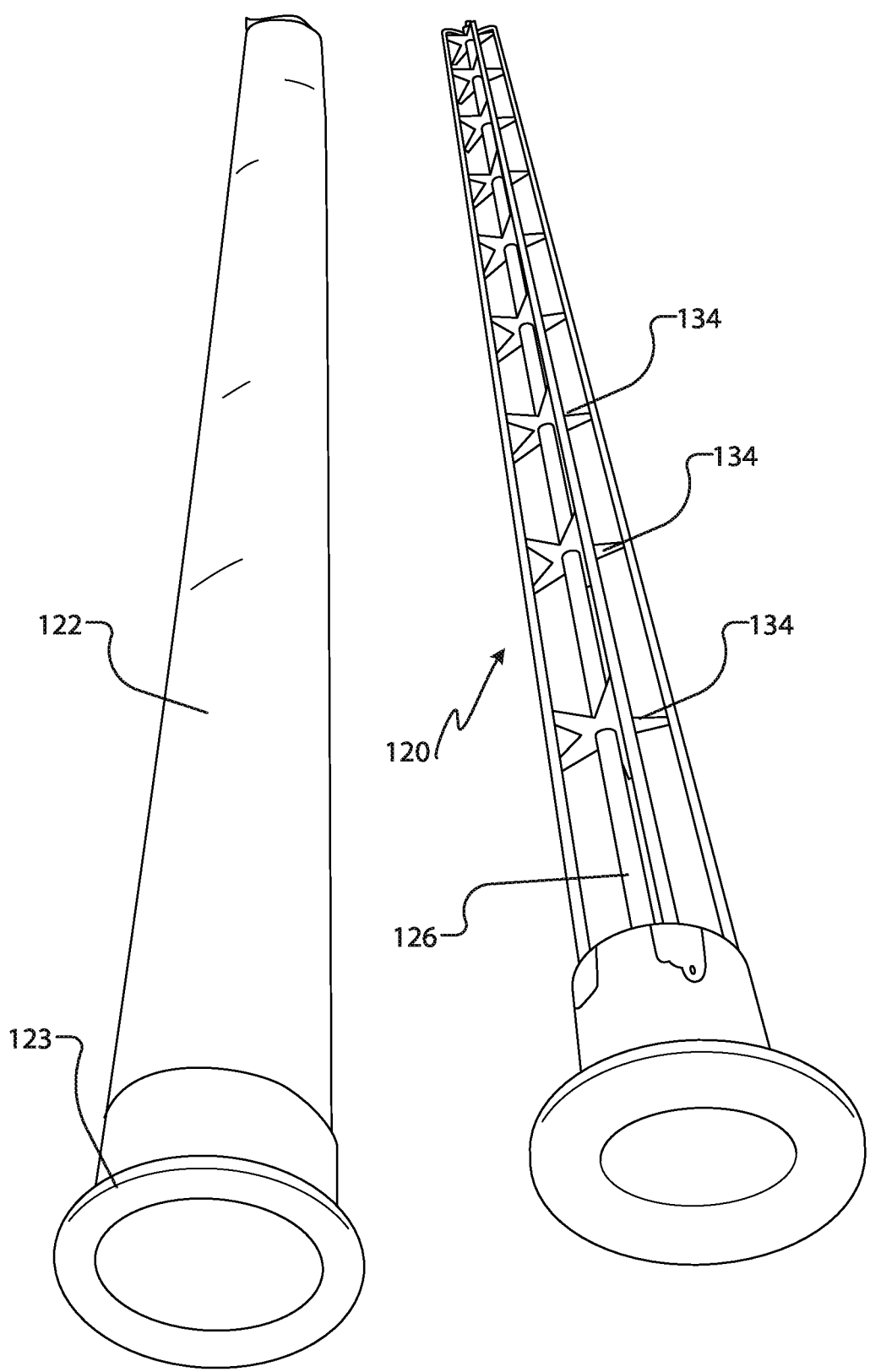
FIG. 4 shows a top perspective view of an example embodiment of a filter support element and accompanying filter media.
Figure 5:
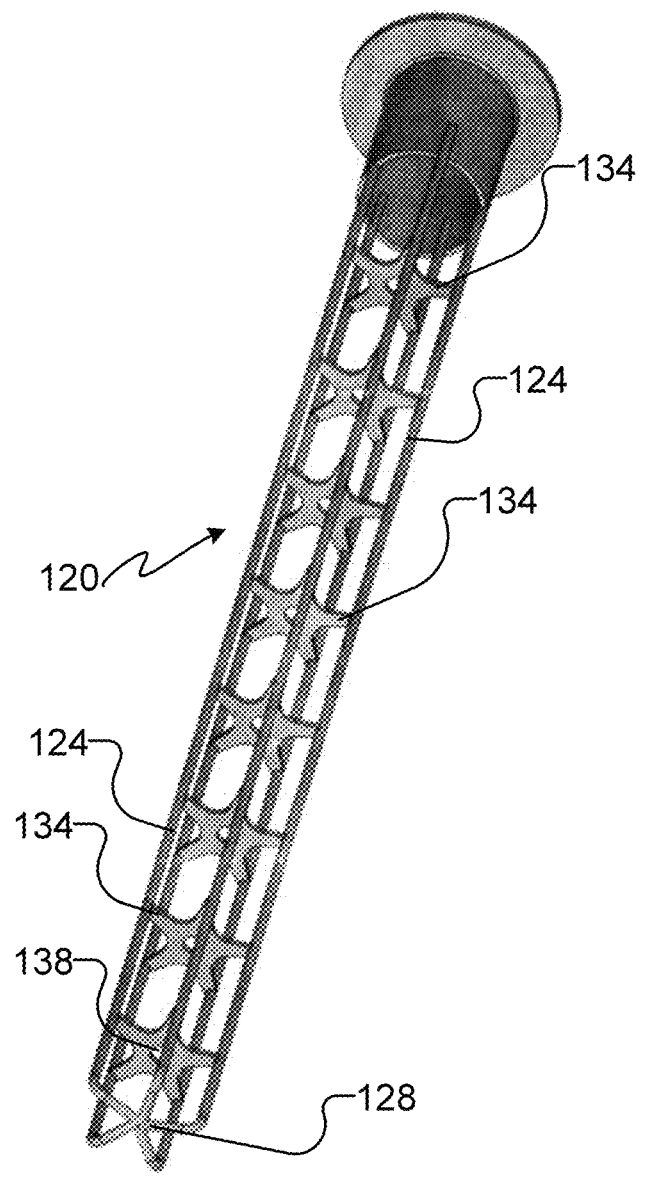
FIG. 5 shows a bottom perspective view of an example embodiment of a filter support element, with the central support omitted.
Figure 6A:
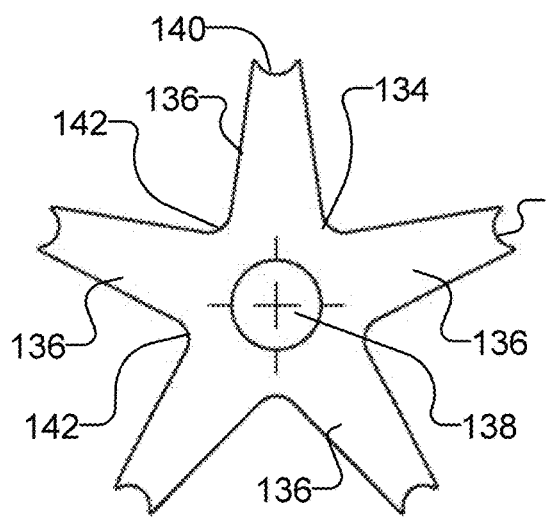
FIGS. 6A, 6B, 6C and 6D show alternative embodiments of spacing elements having five arms (FIGS. 6A and 6B) or six arms (FIGS. 6C and 6D).
Figure 6B:
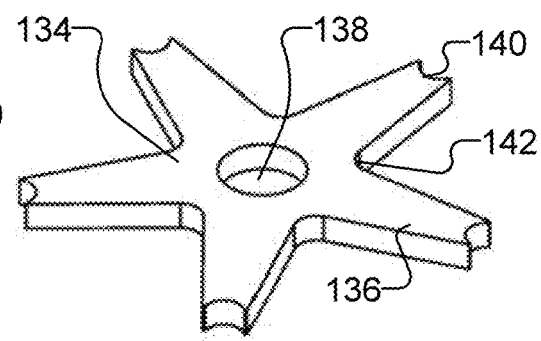
Figure 6C:
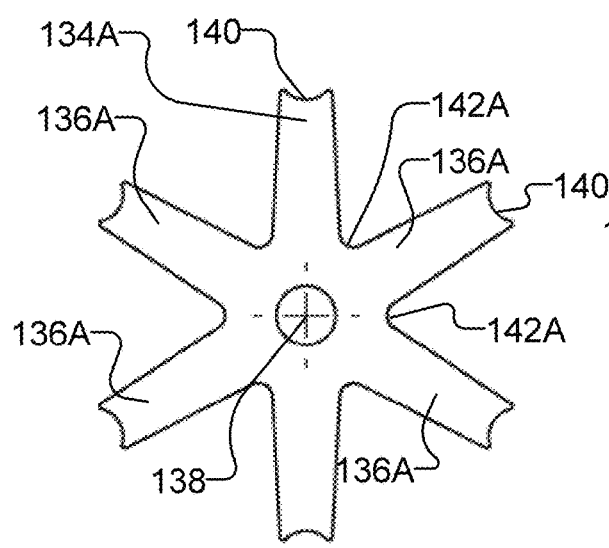
Figure 6D:
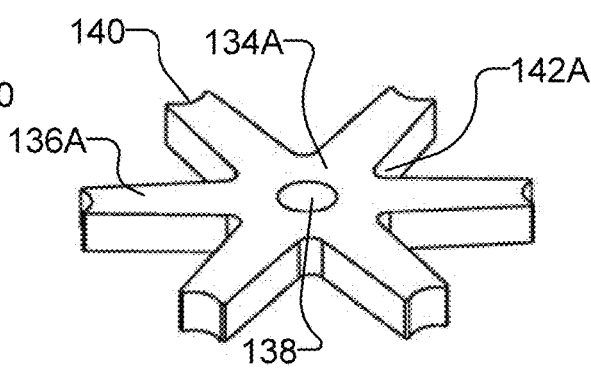

An example embodiment of a filter support element 120 is illustrated in FIGS. 3-5. A corresponding piece of filter media 122, which is a filter sock in the illustrated embodiment, is shown alongside filter support element 120 in FIGS. 3 and 4. In use, filter media 122 is fitted over filter support element 120 to allow pressure filtration to take place.

In the illustrated embodiment, filter support element 120 is generally cylindrical in shape, and filter media 122 has a corresponding generally cylindrical shape so that it can be fitted over filter support element 120. In alternative embodiments, filter support element 120 could be provided with other shapes, e.g. a cylinder having a triangular, square or other polyhedral-shaped cross-section, provided that filter media 122 is provided with a corresponding shape so that it can be fitted over or around filter support element 120.

Filter support element 120 has a plurality of side supports 124 generally evenly radially spaced apart from a central support 126 that define a filter support surface between them. That is, the shape of filter media 122 when in use should correspond to the shape of the filter support surface defined between side supports 124. In the illustrated embodiment, side supports 124 define a filter support surface that is generally cylindrical in shape. The plurality of side supports 124 also define the generally cylindrical outer perimeter of filter support element 120 and support filter sock 122 in position during pressure filtration. In the illustrated embodiment of FIGS. 3-5, filter support element 120 has five side supports 124. In alternative embodiments, any desired number of side supports could be used, e.g. four, six, seven, eight, nine, ten or more. In the illustrated embodiment of FIGS. 10A-10G, filter support element 120A has six side supports 124A.

In the illustrated embodiment, side supports 124 are shown as generally cylindrical in shape. In alternative embodiments, side supports 124 can have alternative shapes, for example, hollow cylindrical tubes, generally planar shapes (e.g. rectangular) that are oriented to extend generally longitudinally, cylindrical shapes having a triangular, square or other polyhedral cross-section, and so on. In some embodiments in which side supports 124 are provided with a generally planar shape, side supports 124 are oriented so that a thin edge portion of the side support 124 contacts the filter media 122, to minimize the surface area of side support 124 in contact with the filter media 122.

For example, as shown schematically in FIGS. 8A-8D, an example embodiment of a filter support element 120B has three side supports 124B having a generally planar configuration and extending longitudinally so that a thin outer edge 125B of the side support 124B contacts the filter media 122 in use. Other components in FIGS. 8A-8D that correspond to components of filter support element 120 are shown with like reference numerals with the letter B appended thereto, and are not further described again herein.

In the illustrated embodiment of FIGS. 8A-8D, a plurality of spacing elements 134B are provided at longitudinally spaced-apart intervals and extend between adjacent pairs of side supports 124B to provide structural reinforcement to the design of filter support element 120B. In alternative embodiments, spacing elements 134B can be omitted. In the illustrated embodiment of FIGS. 8A-8D, a plurality of apertures 146B are provided through side supports 124B. In alternative embodiments, apertures 146B are omitted.

In the illustrated embodiment of FIGS. 8A-8D, the thin edge 125B of each one of side supports 124B is provided with a slight fin or tangentially projecting element 127B that extends along the longitudinal length of side support 124B, to further support filter media 122 in use. In some embodiments, tangentially projecting element 127B is omitted.

In the illustrated embodiment of FIGS. 8A-8D, the bottom tip 128B is provided at the terminus of side supports 124B, and a final spacing element 134B defines the bottom tip 128B of filter support element 120B.

The provision of side supports 124 significantly decreases the amount of surface area of the filter support element 120 that is in contact with the filter media 122 as compared with prior art designs of which the inventors are aware. The decreased surface area provides for lighter weight, and also assists in installation and removal of the filter media 122 from the filter support element 120 due to less friction or drag because e.g. the filter media can move into the open spaces defined between the side supports 124. The decreased surface area also facilitates more rapid cleaning of filter support element 120 after removal from filter support element 120 during a change of filter media 122.

Figure 1A:
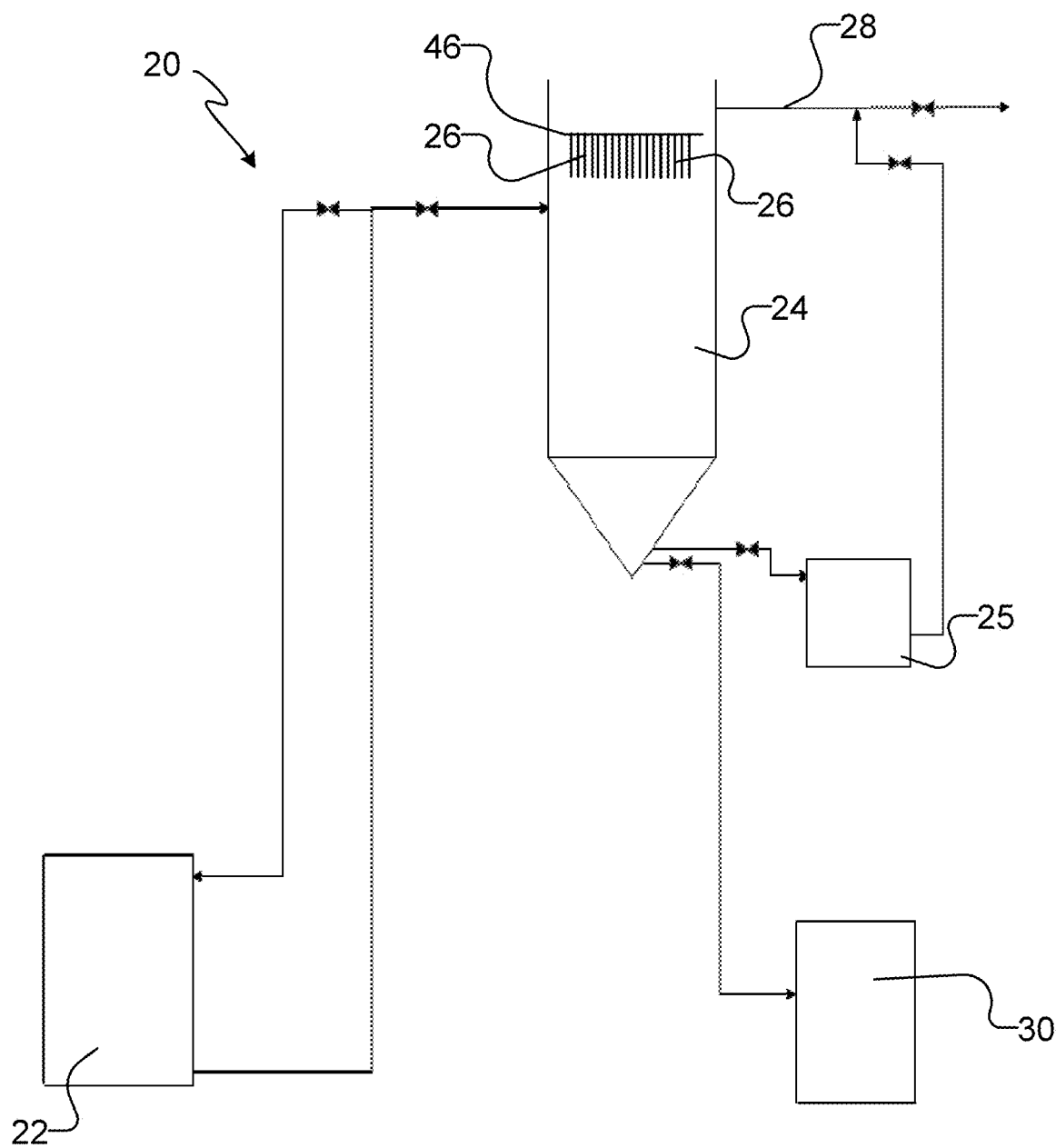
FIG. 1A shows an example embodiment of a white liquor filtration process.
Figure 1B:
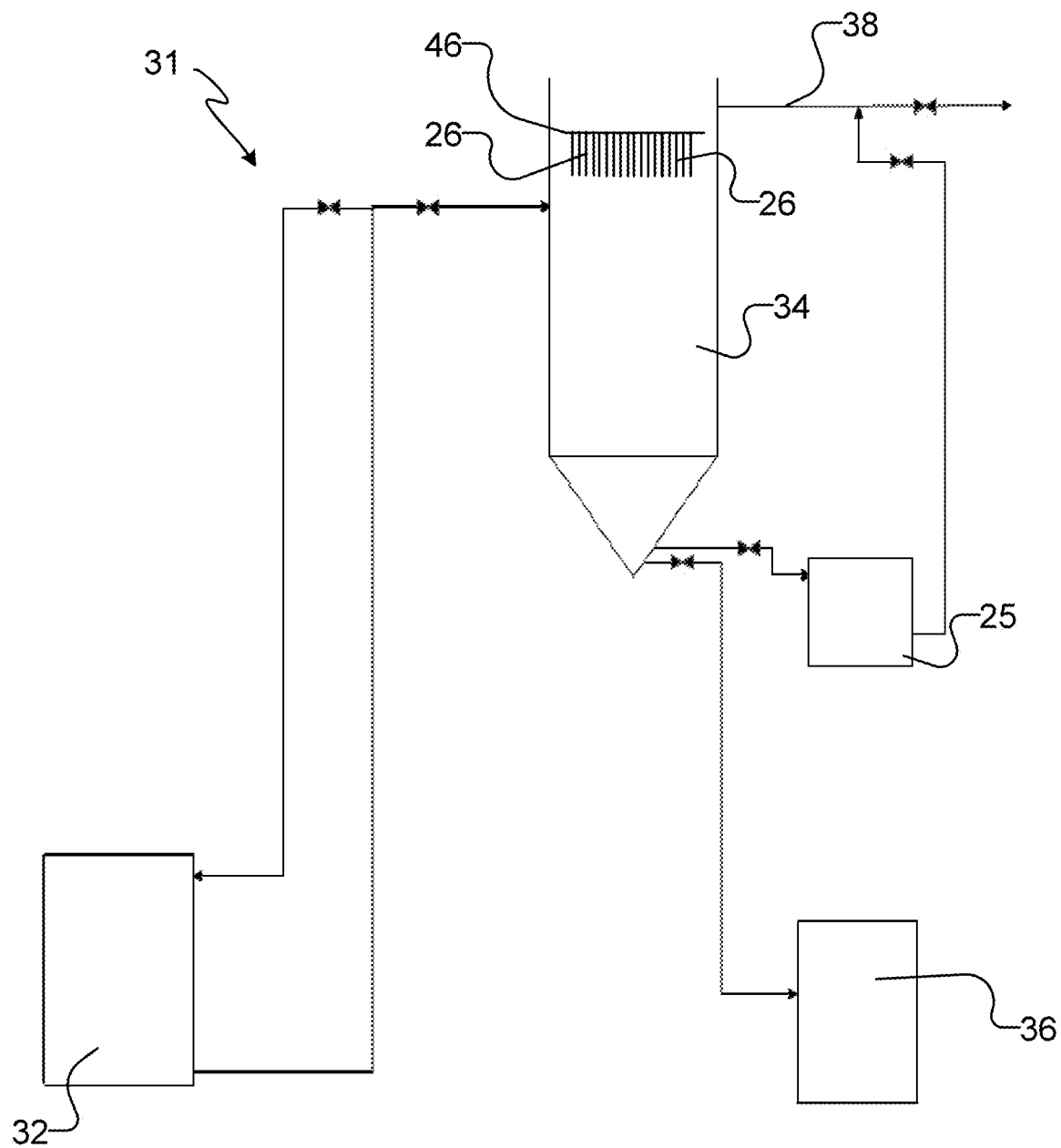
FIG. 1B shows an example embodiment of a lime mud washing liquor filtration process.
Figure 2A:
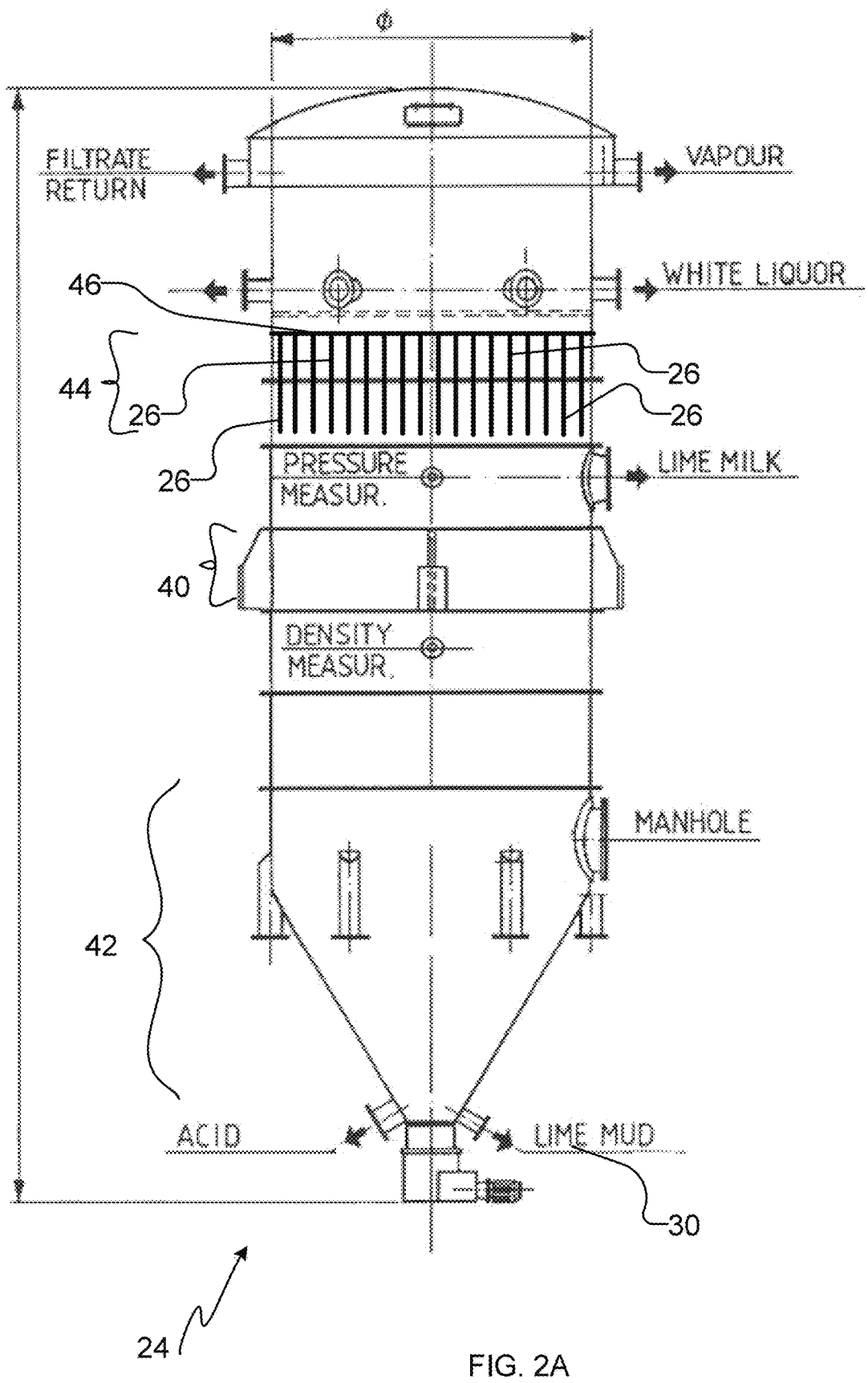
FIGS. 2A and 2B show example embodiments of a pressure filter containing a plurality of filtering elements.
Figure 2B:
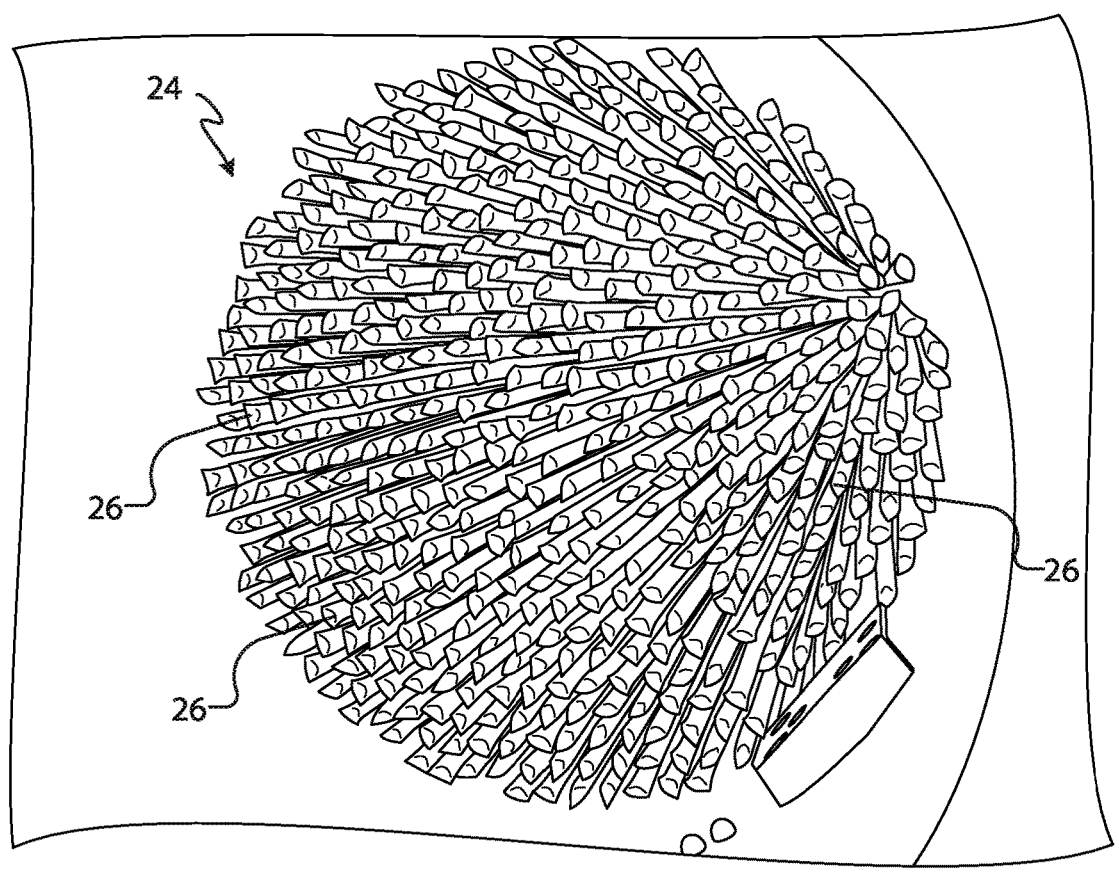

Filter support element 120 has a bottom tip 128 and a top head 130 that is suitable for mounting filter support element 120 in a pressure filter. In the illustrated embodiment, top head 130 is provided with a radially outwardly extending lip 132 that can be installed between the tube sheet and the retaining plate (e.g. 46 in FIG. 2A) in a pressure filter. In some embodiments, filter media 122 is provided with a top lip 123 that interposes the radially outwardly extending lip 132 of filter support element 120 and the retaining plate, so that filter media 122 will be secured in place by the engagement of filter support element 120 to the retaining plate of the pressure filter.

Filter support element 120 also has a plurality of spacing elements 134 (best seen in FIGS. 4, 5, 6A and 6B) positioned at axially spaced apart intervals. Each one of the spacing elements 134 extends between central support 126 and side supports 124 to provide additional strength and rigidity to filter support element 120. In some embodiments, the spacing between each pair of adjacent spacing elements 134 is generally consistent. In some embodiments, the spacing between each pair of adjacent spacing elements 134 is different. The relative positions of the spacing elements may be closer together in regions of filter support element 120 that are expected to experience greater stresses when in use than in other regions of filter support element 120.

Figure 7:
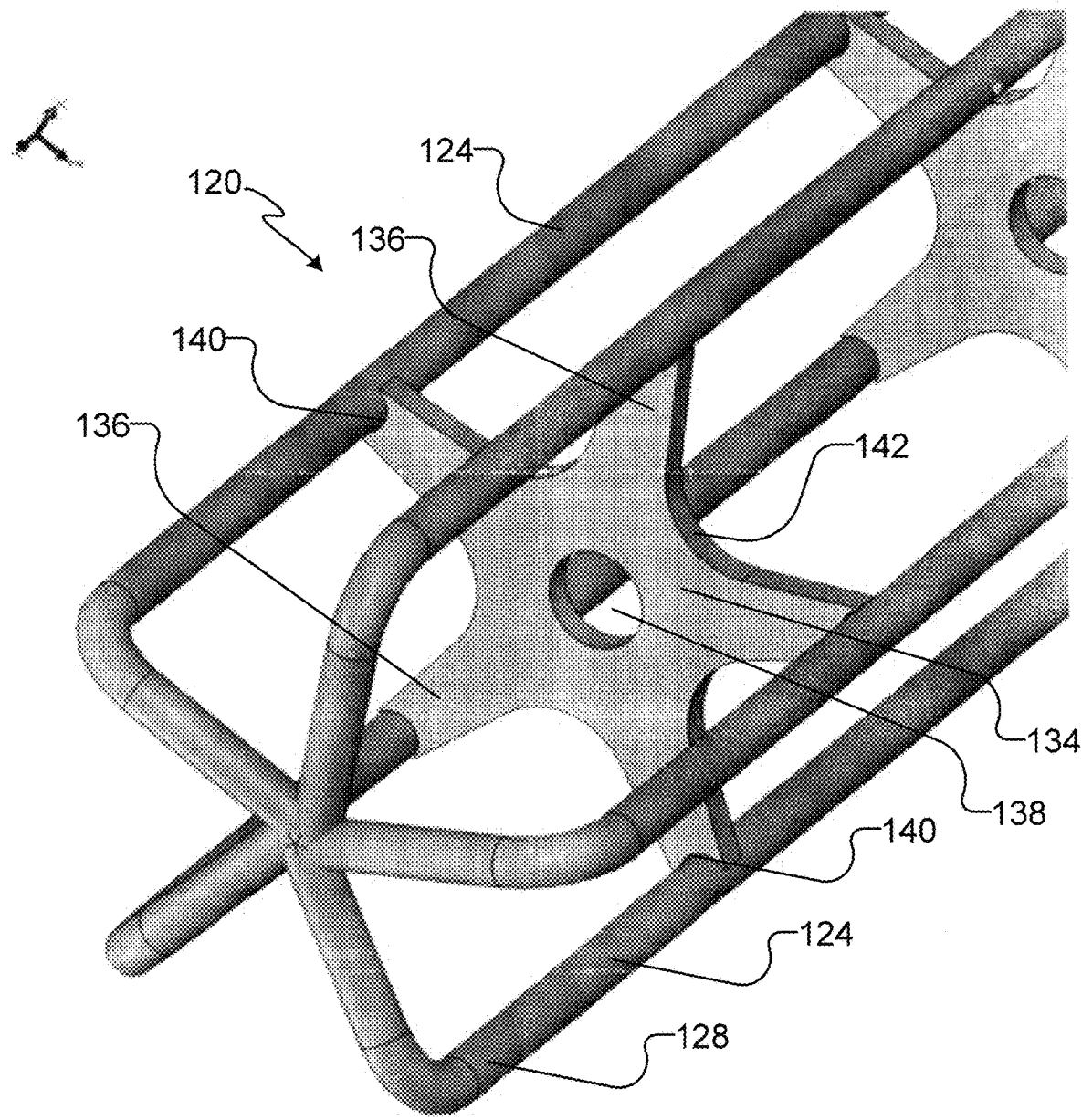
FIG. 7 shows a perspective view of the bottom tip of an example embodiment of a filter support element, with the central support omitted.
Figure 8A:
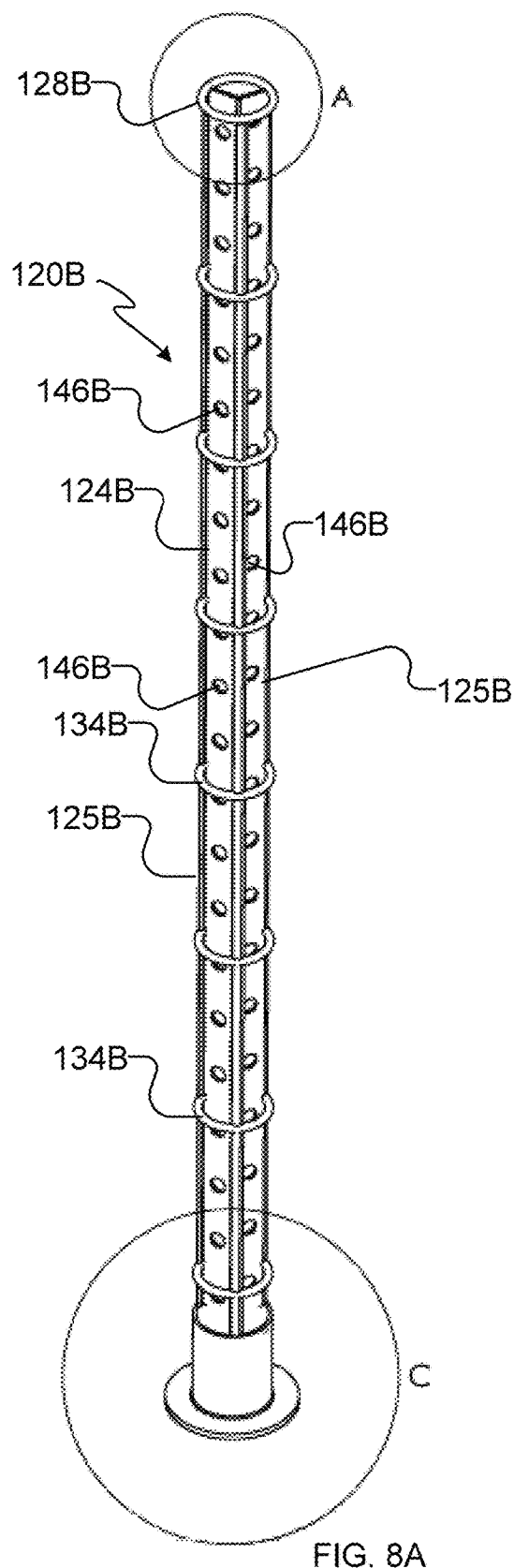
FIGS. 8A-8D show an example embodiment of a filter support element having generally planar side supports.
Figure 8B:
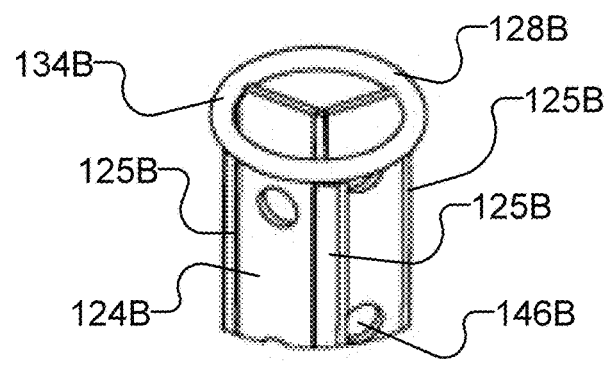
Figure 8C:
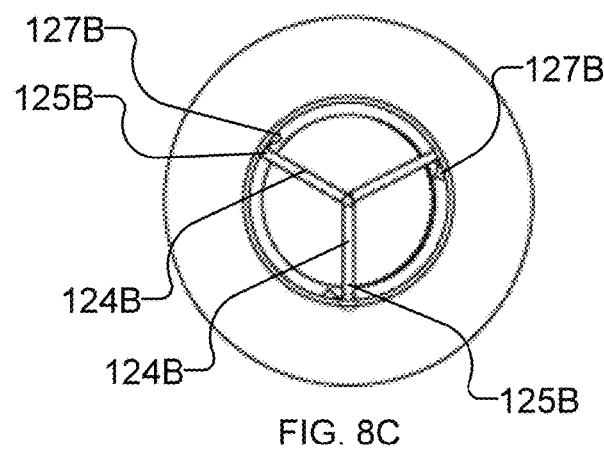
Figure 8D:
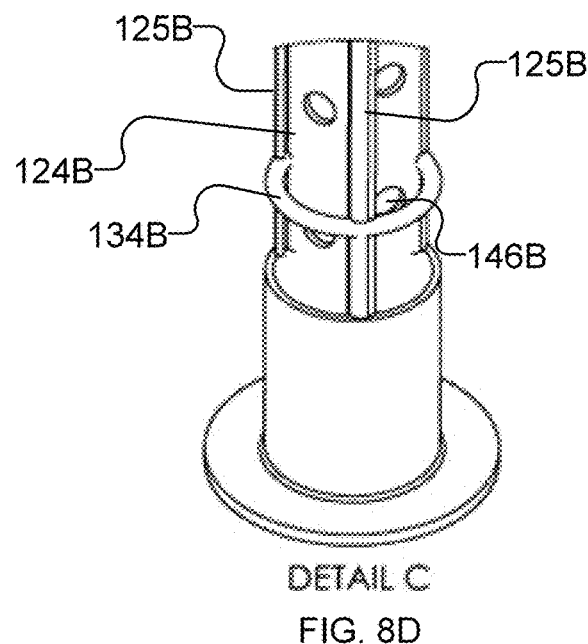

In some embodiments, as illustrated in FIGS. 5 and 7, central support 126 is omitted. In such embodiments, central aperture 138 of spacing elements 134 can be present or omitted, and the spacing elements 134 extend between side supports 124.

Example embodiments of spacing elements 134 and 134A are shown in FIGS. 6A, 6B, 6C and 6D. Spacing element 134 has five radially outwardly extending arms 136, and is for use in embodiments of filter support element 120 having five side supports 124. Each spacing element 134 has a central aperture 138 through which central support 126 can extend, and a curved tip 140 sized and configured to engage with the inner surface of a corresponding one of the side supports 124, as best seen in FIG. 7. Curved tip 140 is provided with a generally arced shape that is complementary to the curve of the inner surface of side support 124. A recessed region 142 is defined between each pair of adjacent arms. The general shape of spacing elements 134 and 134A can be referred to as a star shape, i.e. having a plurality of arms radiating outwardly from a central point.

Spacing element 134A is generally similar to spacing element 134, except that spacing element 134A has six radially outwardly extending arms 136A, and is for use in embodiments of filter support element 120 having six side supports 124, as shown in FIGS. 10A-10G. A recessed region 142A is defined between each pair of adjacent arms 136A of spacing element 134A.

In alternative embodiments, spacing element 134 or 134A could be provided with any desired number of arms 136/136A. Generally, the number of arms 136/136A provided on spacing element 134 or 134A corresponds to the number of side supports 124 provided on filter support element 120.

In alternative embodiments, rather than using spacing elements 134, a spiral rod wrap is used to interconnect side supports 124 and central support 126, to provide the necessary stiffness and strength to filter support element 120. A spiral rod wrap is a long wire or rod that is spiraled around the outer perimeter of the side supports 124 along substantially the full length of filter support element 120. In some embodiments, the spiral rod wrap can be installed on the inner perimeter of the side supports 124 along substantially the full length of the filter support element 120.

In some embodiments, the filter support element 120 can be manufactured in any desired length and diameter as required for a given application.

In one example embodiment, filter support element 120 is manufactured from sheet metal that is cut and bent to provide the desired shape of central support 126 and side supports 124. The side supports 124 are curved inwardly together at bottom tip 128 and are ultimately welded to one another and to central support 126.

Figure 9:
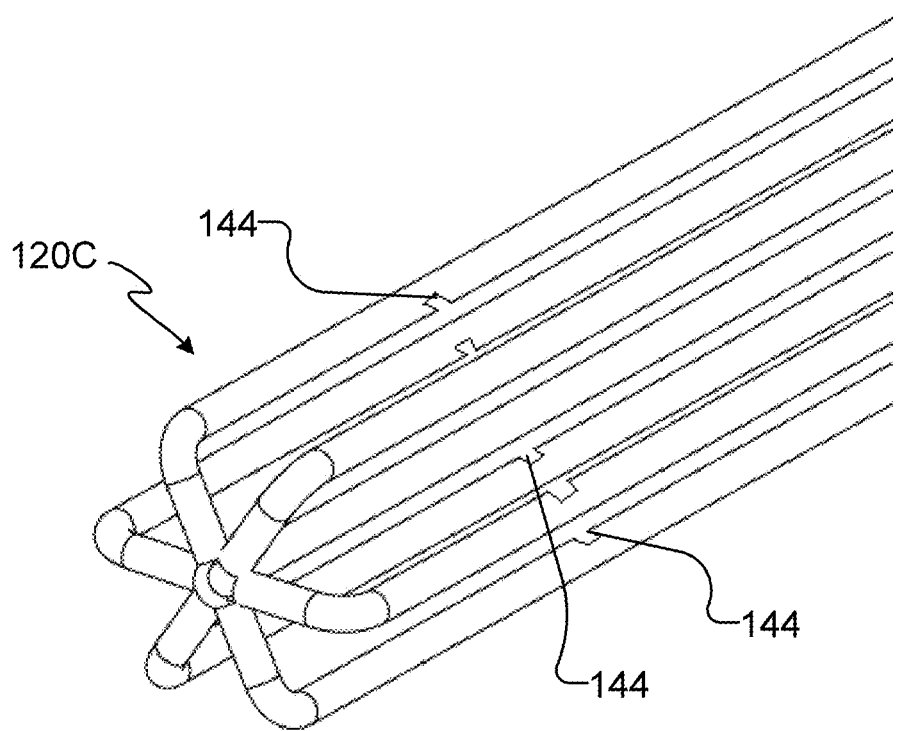
FIG. 9 shows an example embodiment of a filter support element, having shown schematically thereon in an exaggerated manner for purposes of illustration notches for accommodating spacing elements.
Figure 10A:
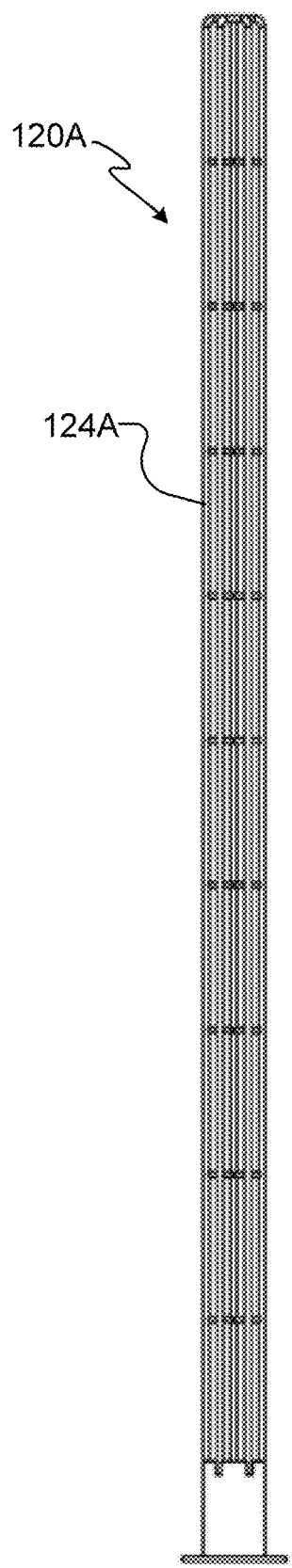
FIGS. 10A-10G show an example embodiment of a filter support element having six side supports and a plurality of spacing elements having six arms.
Figure 10B:
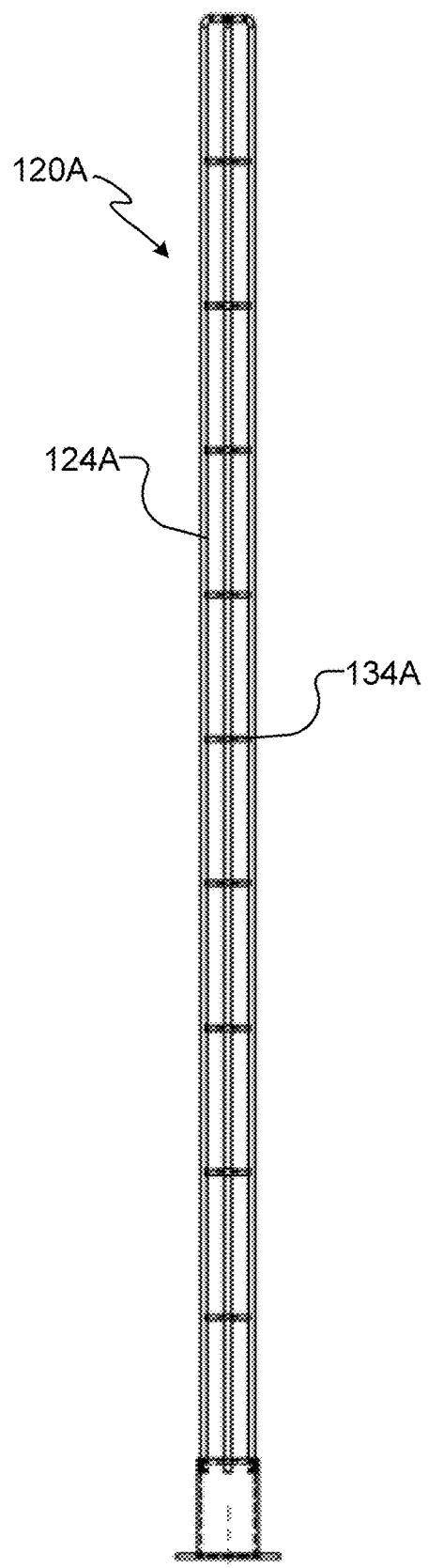
Figure 10C:
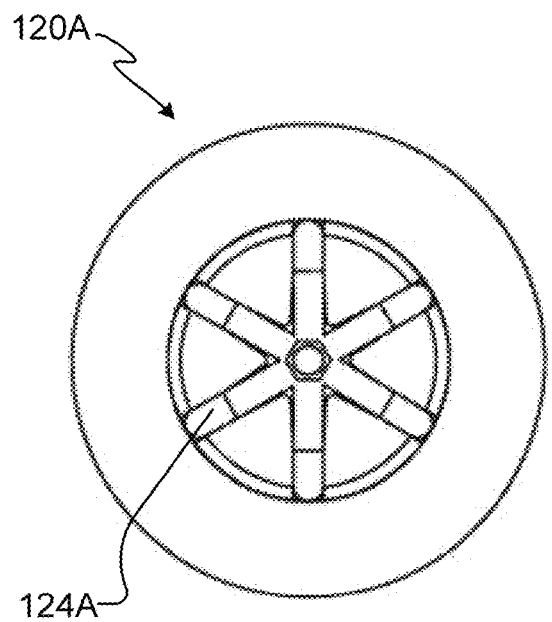
Figure 10D:
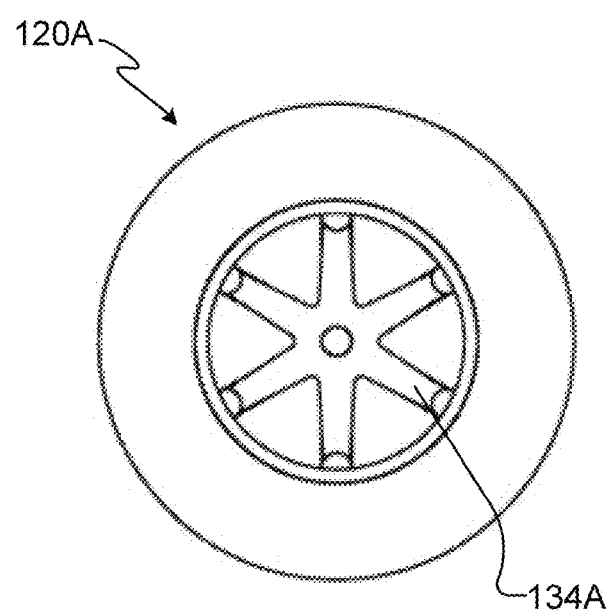
Figure 10E:
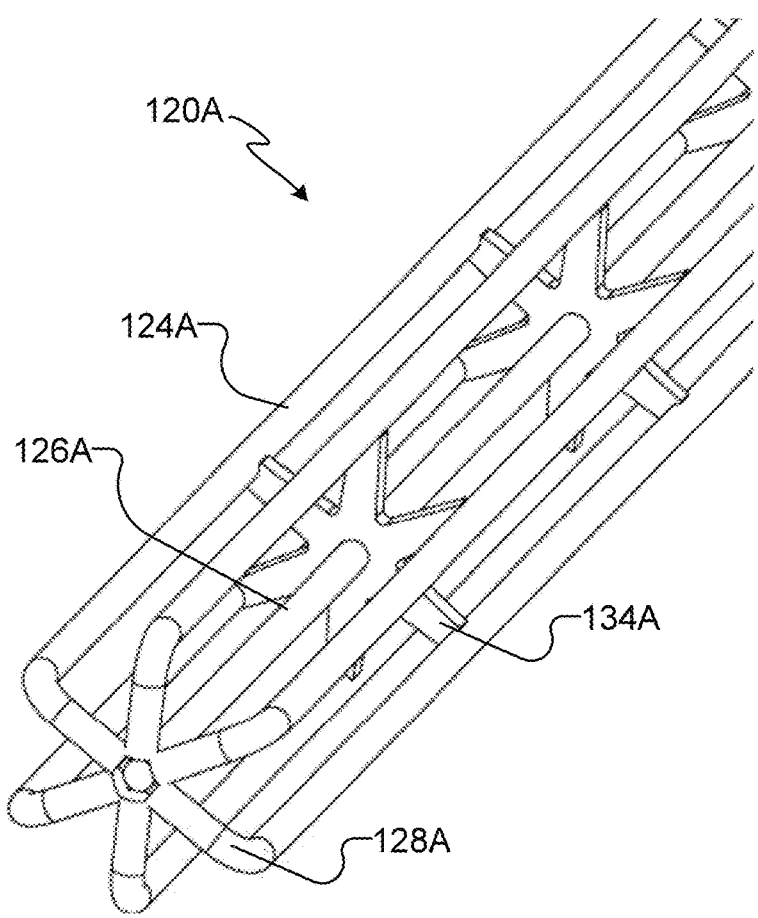
Figure 10F:
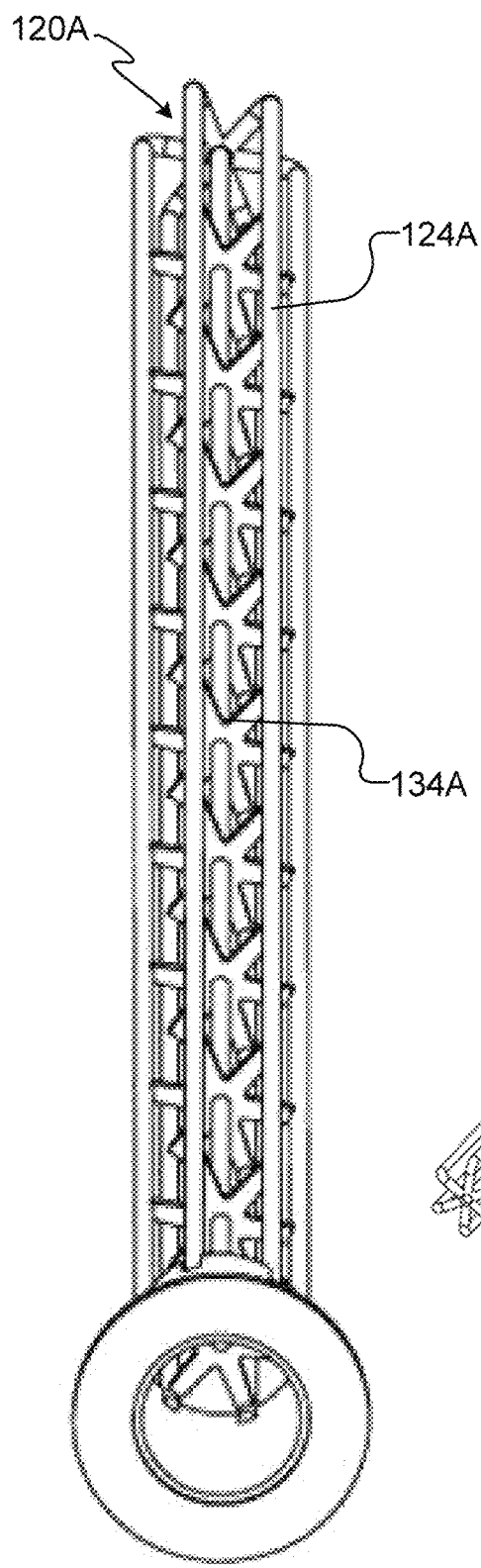
Figure 10G:
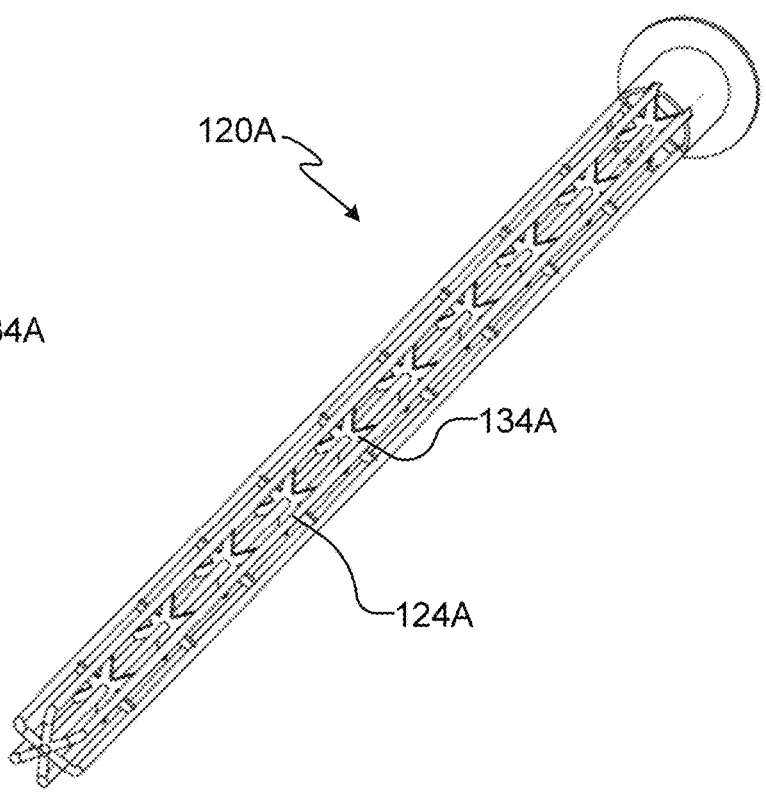

In some embodiments, side supports 124 and central support 126 are notched at the location where spacing elements 134 will be secured, to better accommodate spacing elements 134, for example as illustrated schematically as notches 144 in filter support element 120C shown in FIG. 9. Notches 144 are shown in an exaggerated schematic manner in FIG. 9 for the purpose of rendering them easily viewable; notches 144 should be shaped and configured to accommodate the tips of arms 136, including curved tips 140 where present. In some embodiments, side supports 124 and central support 126 are notched on their outer edges to accommodate a spiral rod wrap. In some embodiments, side supports 124 and central support 126 are not notched.

FIGS. 10A-10G show an alternative example embodiment of a filter support element 120A having six side supports 124A and a plurality of spacing elements 134A having six arms 136A. Components of filter support element 120A that have the same function as components of filter support element 120 are illustrated with corresponding reference numerals with the letter A appended thereto, and are not further described herein.

To manufacture filter support element 120, a plurality of spacing elements 134 fabricated from a suitable material such as stainless steel are passed over central support 126 via their central aperture 138, and are welded in place to both central support 126 and to the inner surfaces of side supports 124 via curved tips 140. In embodiments in which central support 126 is omitted, spacing elements 134 are welded directly in place on the inner surfaces of side supports 124.

In some embodiments, curved tips 140 facilitate welding of spacing elements 134 to side supports 124. In other embodiments, curved tips 140 are omitted and arms 136 of spacing elements 134 are welded directly to side supports 124.

At the top head 130 of filter support element 120, any desired style or model of flange and neck can be installed, so that filter support element 120 can be deployed in any desired manner to support filter media 122.

Without being bound by theory, the design of filter support element 120 allows the manufacture of a lighter filter support element than could be achieved using previous designs known to the inventors. The lighter weight of the filter support element allows for easier installation of the filter support elements, even when provided with a long length. The design also facilitates easier removal of filter elements from the supports on which they are deployed, as the filter media can shift into the open spaces defined by the side supports 124. Cleaning of the filter support element 120 after removal of the filter media is also easier than in previous designs because of the reduced surface area of the structure.

Figure 11:
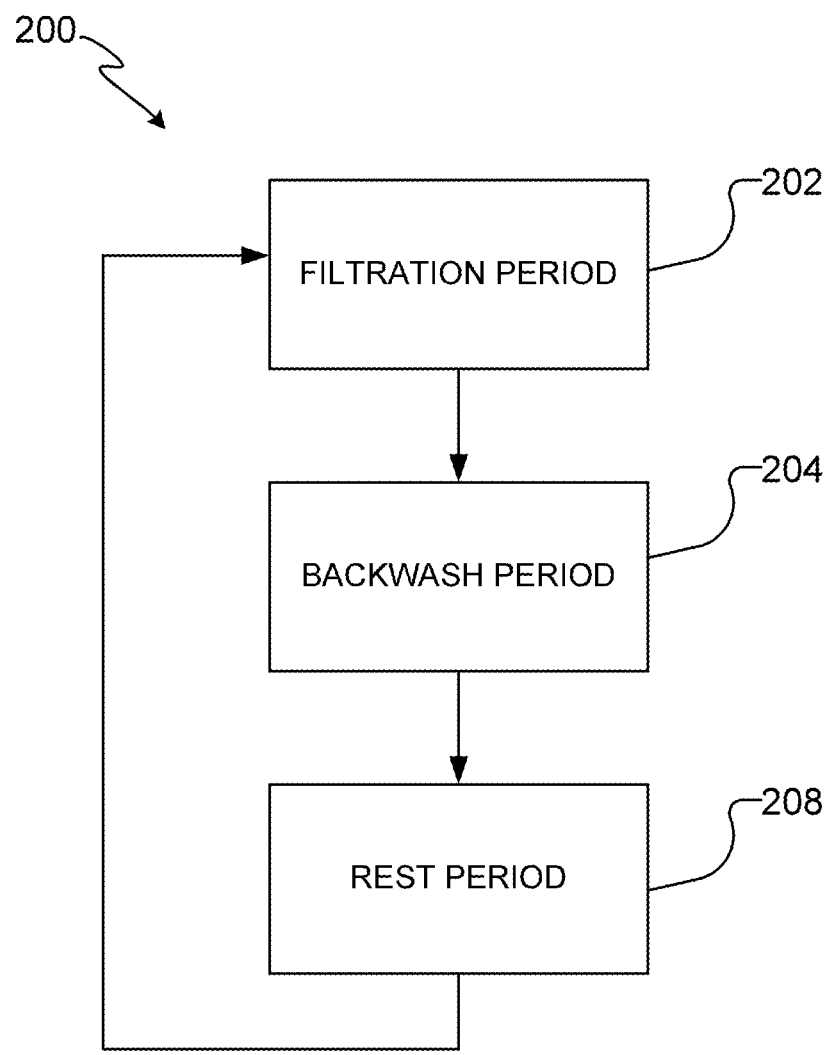
FIG. 11 shows an example embodiment of a candle filtration process.

In use in a typical candle filtration process 200 as shown in FIG. 11, influent is forced through filter media 122 for a filtration period 202, e.g. for a period in the range of 1-10 minutes or longer, including any value therebetween e.g. 2, 3, 4, 5, 6, 7, 8 or 9 minutes, including optionally partial minutes e.g. 2.2, 3.1, 4.7, 5.8, 6.3, etc. During this filtration period 202, a cake of solid material begins to accumulate on the upstream side of the filter media 122. A backwash is then conducted for a backwash period 204, e.g. for a period in the range of 1-30 seconds, including any value therebetween e.g. 2, 3, 4, 5, 6, 7, 8, 9, 10, 15, 20 or 25 seconds, including optionally partial seconds e.g. 3.1, 3.4, 4.2, 5.7, 6.5, 7.9, 8.3, etc., to force accumulated solid matter off the upstream surface of the filter media 122. A rest period 208 is typically provided after the backwash period to allow for sedimentation of solids, e.g. for between 15 seconds and 1 minute, including any value therebetween, e.g. 20 seconds, 25 seconds, 30 seconds or 45 seconds, including optionally partial seconds. The next filtration period 202 then commences. The values given in this paragraph are exemplary only and not limiting. A person skilled in the art would select appropriate durations for the filtration, backwash and rest periods based on the particular filtration process being conducted.

Without being bound by theory, during use of filter support element 120 during the filtration period, the filter media 122 is permitted to move inwardly towards the axial centreline of filter support element 120, without contacting itself or the central support 126 of filter support element 120, and without significantly contacting spacing elements 134 (because the recessed region 142 of spacing elements 134 allows filter media 122 to bend inwardly without significantly contacting the material of spacing elements 134). It is believed this reduces or eliminates pleating of the filter media (which is a current point of failure), and allows the filter media 122 to better discharge the filter cake away from the filter core during the backwash period, providing enhanced cleaning of filter media 122 with each backwash. A "quick ballooning action" caused by this motion is believed to provide a snap discharge of filter cake to better clean the filter media 122 during each backwash cycle. Keeping the filter media cleaner longer through enhanced cleaning at each backwash may increase the life of the filter media, thereby decreasing the frequency of acid washes and filter media cleanings and changes.

The inventors have observed that filter support elements according to embodiments of the present invention can be removed from their corresponding tube sheet with much greater ease than prior art filter support elements conventionally in use. This reduces the amount of time required for plant maintenance, and also improves conditions for the workers who change the filters by improving the ergonomics of removing the filter support elements and filter socks when changing filter media. That is, a safety benefit is achieved because the filter support element can be easily separated from the filter sock, so that less back or other injuries related to the physical strain required to lift the filter support element for filter sock removal are sustained. The inventors have also observed that filter support elements according to embodiments of the present invention allow for a higher volume throughput, by as much as 25% more, compared to prior art filter support elements conventionally in use.

The inventors have also observed that the life of filter socks used in combination with filter support elements according to embodiments of the present invention is increased relative to the life of filter socks used with prior art filter support elements conventionally in use. Formation of axial pleats in the filter socks, which commonly occurs with prior art filter support elements, is reduced or eliminated by use of filter support elements according to embodiments of the present invention. The inventors anticipate that the life of a filter sock used with a filter support element according to an embodiment of the present invention may be increased by as much as 25% to 50% relative to prior art filter support elements, including any value therebetween e.g. 30%, 35%, 40% or 45%. The estimated increase in filter sock life is calculated based on observations of existing filters in which a portion of the filter support elements have been replaced with embodiments of the present invention, while a portion of the filter support elements have remained as prior art filter support elements, to allow a direct comparison under the same operating conditions.

While a number of exemplary aspects and embodiments have been discussed above, those of skill in the art will recognize certain modifications, permutations, additions and sub-combinations thereof. Without limitation, such aspects include the following:

A. A filter support element comprising:
  a plurality of side supports defining a filter support surface; and
  a spacing member connecting the plurality of side supports.
B. A filter support element as defined aspect A, further comprising a central support extending axially between the plurality of side supports, wherein the spacing member connects the plurality of side supports and the central support.
C. A filter support element as defined aspect B, wherein the spacing member comprises a plurality of axially spaced apart spacing elements, each one of the plurality of spacing elements being coupled to the central support and to each one of the plurality of side supports.

D. A filter support element as defined in aspect C, wherein the axially spaced apart spacing elements are generally evenly spaced apart.

E. A filter support element as defined in any one of aspects A to C, wherein the axially spaced apart spacing elements are unequally spaced apart.

F. A filter support element as defined in any one of aspects A to E, wherein each one of the plurality of spacing elements comprises a plurality of arms, each one of the plurality of arms being configured to engage with a corresponding one of the plurality of side supports.

G. A filter support element as defined in aspect F, wherein each one of the plurality of arms comprises a curved tip to engage with the corresponding one of the plurality of side supports.

H. A filter support element as defined in any one of aspects A to G, wherein a recessed region is defined between each adjacent pair of the plurality of arms.

I. A filter support element as defined in any one of aspects A to H, wherein each one of the plurality of spacing elements comprises a central aperture configured to engage with the central support.

J. A filter support element as defined in any one of aspects A to I, wherein the central support is notched to accommodate the spacing member.

K. A filter support element as defined in any one of aspects A to J, wherein each one of the plurality of side supports is notched on an inner surface thereof to accommodate the spacing member.

L. A filter support element as defined in any one of aspects A to K, comprising between three to seven side supports.

M. A filter support element as defined in aspect L, wherein each one of the plurality of spacing elements comprises between three to seven side supports.

N. A filter support element as defined in any one of aspects A to M, comprising five or six side supports.

O. A filter support element as defined in aspect N, wherein each one of the plurality of spacing elements comprises five arms or six arms.

P. A filter support element as defined in any one of aspects A to O, wherein the central support is provided with a plurality of notches, each one of the plurality of notches being positioned at the location of a corresponding one of the plurality of spacing elements.

Q. A filter support element as defined in aspect P, wherein each one of the plurality of side supports is provided with a plurality of notches on an inner surface thereof, each one of the plurality of notches being positioned at the location of a corresponding one of the plurality of arms of the plurality of spacing elements.

R. A filter support element as defined in aspect A, wherein the spacing member comprises a spiral rod wrap.

S. A filter support element as defined in any one of aspects A to R, wherein the spacing member comprises a star shape.

T. A filter support element as defined in any one of aspects A to S, wherein the side supports comprise generally planar longitudinally extending side supports.

U. A filter support element as defined in aspect T, comprising spacing elements positioned at longitudinally spaced-apart intervals connecting adjacent ones of the longitudinally extending side supports.

V. A filter support element as defined in any one of aspects T or U, wherein the planar side supports comprise a plurality of apertures formed therethrough.

W. A filter support element as defined in any one of aspects T to V, wherein the planar side supports comprise a tangentially protruding fin extending longitudinally along an outer edge thereof.

X. A method of separating a solid from a liquid, the method comprising the steps of:
providing a plurality of filter support elements, each one of the plurality of filter support elements having:
a plurality of side supports defining a filter support surface; and
a spacing member connecting the plurality of side supports;
securing a filter media sock over each one of the plurality of filter support elements;
securing each one of the plurality of filter support elements and the corresponding filter media sock in place within a pressure filter to provide a plurality of filtration units; and
passing liquid through the plurality of filtration units.

Y. A method as defined in aspect X, wherein the step of passing liquid through the plurality of filtration units comprises:
for a filtration period, passing a feed liquid containing the solid entrained within the liquid through the plurality of filtration units in a downstream direction; and
for a backwash period, passing a backwash liquid through the plurality of filtration units in an upstream direction.

Z. A method as defined in aspect Y, wherein during the backwash period, filter cake is forced off of the plurality of filtration units.

AA. A method as defined in any one of aspects X to Z, wherein, during the filtration period, each one of the filter media socks is moved inwardly between each adjacent pair of the plurality of side supports of the corresponding one of the plurality of filter support elements.

BB. A method as defined in aspect AA, wherein, during the backwash period, each one of the filter media socks snaps outwardly between each adjacent pair of the plurality of side supports of the corresponding one of the plurality of filter support elements.

CC. A method as defined in any one of aspects X to BB, wherein each one of the plurality of filter support elements comprises a central support extending axially between the plurality of side supports, and wherein the spacing member of each one of the plurality of filter support elements connects the plurality of side supports and the central support of a corresponding one of the plurality of filter support elements.

DD. A method of separating a solid from a liquid comprising using a filter support element as defined in any one of aspects A to W together with a filter sock in a candle filtration process.

It is therefore intended that the following appended claims and claims hereafter introduced are interpreted to include all such modifications, permutations, additions and sub-combinations as are consistent with the broadest interpretation of the specification as a whole.

The invention claimed is:

1. A pressure filter for separating a solid from a liquid, the pressure filter comprising:
a plurality of filtering elements supported by a retaining plate within a filtration zone of the pressure filter for separating the solid from the liquid; and
a settling zone positioned below the plurality of filtering elements for collecting the solid separated from the liquid by the plurality of filtering elements;

each one of the plurality of filtering elements comprising
   a filter support element comprising:
   a plurality of side supports defining a filter support
      surface; and
   a spacing member connecting the plurality of side
      supports;
   the spacing member comprising a plurality of axially
      spaced apart spacing elements; each one of the
      plurality of axially spaced apart spacing elements
      comprising a plurality of arms;
   each one of the plurality of arms being configured to
      engage with a corresponding one of the plurality of side
      supports, an unobstructed recessed region being
      defined between each pair of adjacent arms on each one
      of the spacing members for receiving filter media of a
      filter when the filter support element is in use;
   a central support extending axially between the plurality
      of side supports of the filter support element, wherein
      the spacing member connects the plurality of side
      supports and the central support;
   wherein the central support is notched to accommodate
      each one of the plurality of axially spaced apart spacing
      elements.

2. The pressure filter as defined in claim 1, wherein the axially spaced apart spacing elements of the filter support element are evenly spaced apart.

3. A method of using the pressure filter as defined in claim 1 to filter a solid from a liquid, the method comprising the steps of:
   providing the pressure filter as defined in claim 1;
   securing a filter media sock over each one of the filter support elements of each one of the plurality of filtering elements;
   securing each one of the filter support elements and the corresponding filter media sock in place via the retaining plate of the pressure filter to provide a plurality of filtration units; and
   passing a feed liquid through the plurality of filtration units, wherein the step of passing the feed liquid through the plurality of filtration units comprises:
      for a filtration period, passing the feed liquid containing the solid entrained within the feed liquid through the plurality of filtration units in a downstream direction; and
      for a backwash period, passing a backwash liquid through the plurality of filtration units in an upstream direction.

4. The pressure filter as defined in claim 1, wherein each one of the plurality of arms comprises a curved tip to engage with the corresponding one of the plurality of side supports.

5. The pressure filter as defined in claim 1, wherein each one of the plurality of spacing elements comprises a central aperture.

6. The pressure filter as defined in claim 5, wherein the central aperture of each one of the plurality of spacing elements is configured to engage with the central support.

7. The pressure filter as defined in claim 1, wherein the filter support element comprises five or six side supports.

8. The pressure filter as defined in claim 7, wherein each one of the plurality of spacing elements comprises five arms or six arms.

9. The pressure filter as defined in claim 1, wherein the central support is provided with a plurality of notches, each one of the plurality of notches being positioned at the location of a corresponding one of the plurality of spacing elements.

10. The pressure filter as defined in claim 9, wherein each one of the plurality of side supports is provided with a plurality of notches on an inner surface thereof, each one of the plurality of notches being positioned at the location of a corresponding one of the plurality of arms of the plurality of spacing elements.

11. The pressure filter as defined in claim 1, wherein each one of the plurality of spacing elements comprises a star shape having between four and ten vertices.

12. The pressure filter as defined in claim 1, wherein the side supports comprise planar longitudinally extending side supports.

13. The pressure filter as defined in claim 12, wherein the plurality of spacing elements are positioned at longitudinally spaced-apart intervals connecting adjacent ones of the longitudinally extending side supports.

14. The pressure filter as defined in claim 12, wherein the planar side supports comprise a plurality of apertures formed therethrough.

15. The pressure filter as defined in claim 12, wherein the planar side supports comprise a tangentially protruding fin extending longitudinally along an outer edge thereof.

16. An apparatus for carrying out filtration of white liquor as part of a kraft pulping process, for washing lime mud as part of a kraft pulping process, or for clarifying green liquor as part of a kraft pulping process, the apparatus comprising the pressure filter as defined in claim 1.

17. A pressure filter for separating a solid from a liquid, the pressure filter comprising:
   a plurality of filtering elements supported by a retaining plate within a filtration zone of the pressure filter for separating the solid from the liquid; and
   a settling zone positioned below the plurality of filtering elements for collecting the solid separated from the liquid by the plurality of filtering elements;
   each one of the plurality of filtering elements comprising
      a filter support element comprising:
      a plurality of side supports defining a filter support
         surface; and
      a spacing member connecting the plurality of side
         supports;
      the spacing member comprising a plurality of axially
         spaced apart spacing elements; each one of the
         plurality of axially spaced apart spacing elements
         comprising a plurality of arms;
   each one of the plurality of arms being configured to
      engage with a corresponding one of the plurality of side
      supports, an unobstructed recessed region being
      defined between each pair of adjacent arms on each one
      of the spacing members for receiving filter media of a
      filter when the filter support element is in use;
   wherein each one of the plurality of side supports is
      notched on an inner surface thereof to accommodate
      each one of the plurality of axially spaced apart spacing
      elements.

18. The pressure filter as defined in claim 17 wherein each one of the plurality of arms comprises a curved tip to engage with the corresponding one of the plurality of side supports.

19. The pressure filter as defined in claim 17 wherein each one of the plurality of spacing elements comprises a central aperture.

20. A method of using the pressure filter as defined in claim 17 to filter a solid from a liquid, the method comprising the steps of:
   providing the pressure filter as defined in claim 17;
   securing a filter media sock over each one of the filter support elements of each one of the plurality of filtering elements;

securing each one of the filter support elements and the corresponding filter media sock in place via the retaining plate of the pressure filter to provide a plurality of filtration units; and passing a feed liquid through the plurality of filtration units, wherein the step of passing the feed liquid through the plurality of filtration units comprises:
  for a filtration period, passing the feed liquid containing the solid entrained within the feed liquid through the plurality of filtration units in a downstream direction; and
  for a backwash period, passing a backwash liquid through the plurality of filtration units in an upstream direction.

\* \* \* \* \*